July 28, 1942. J. H. LANCOR, JR 2,291,045
SYNCHRONIZING ARRANGEMENT FOR DETONATION DETECTORS
Filed June 1, 1939

INVENTOR
JOSEPH H. LANCOR, JR.
BY Herbert H. Thompson
HIS ATTORNEY

UNITED STATES PATENT OFFICE 2,291,045

SYNCHRONIZING ARRANGEMENT FOR DETONATION DETECTORS

Joseph H. Lancor, Jr., Brooklyn, N. Y., assignor to Sperry Gyroscope Company, Inc., Brooklyn, N. Y., a corporation of New York Application June 1, 1939, Serial No. 276,785

7 Claims. (Cl. 177—351)

This invention relates to the art of detecting detonation in internal combustion engines and it refers particularly to the provision of means for distinguishing between the vibration set up in an engine frame by detonation and that due to other vibration producing events such as valve operation.

In the detonation detecting system disclosed in the co-pending application of Charles S. Draper and applicant, now Patent No. 2,275,675, dated March 10, 1942, an electromagnetic pick-up unit is rigidly attached to the frame of an engine, for example, an aircraft engine, preferably to a cylinder head and generates an E. M. F. when the engine frame vibrates under the influence of detonation. This pick-up is so designed that the E. M. F. generated is proportional to the rate of change of acceleration of the vibrating member. Severe detonation produces sharply peaked vibrations having high rates of change of acceleration and may be readily detected by an arrangement such as is disclosed in the above mentioned patent. However, in order to anticipate conditions which might be harmful to an engine, it is desirable to detect not only the more severe forms of detonation but to be able to recognize incipient detonation which produces only slight engine frame vibration. Such vibration may be of the same order of magnitude as vibration due to other causes, for example, the closing of the valves, and since the pick-up alone does not distinguish between different causes of vibration, incipient detonation may be obscured and difficult to recognize.

A basis for separating the effects of detonation and valve operation has been found in the sequence of events in the internal combustion engine cycle, it being generally known that detonation can occur only within 90° of crank shaft travel after the occurrence of ignition during which period the valves remain closed. According to my invention, an electrical pulse generated by the ignition system is used as a timing control to render the amplifier to which the detonation indicator is connected operative over only the limited period during which detonation may occur and inoperative when valve events occur so that indications originating in valve clatter may not be interpreted as signifying the occurrence of detonation.

In addition to anticipating conditions which might be harmful to an engine the detection of incipient detonation is of value in promoting fuel economy since detonation is, in part, dependent on the richness of the combustible mixture taken into the engine cylinders, there being less chance for detonation to occur with a rich mixture than with a lean mixture. To provide a margin of safety when the exact detonating point is not known, the mixture is usually kept richer than is necessary and fuel wasted thereby. My novel method of separating detonation effects from vibration due to valve operation makes it possible to provide a sensitive detector which may be used as a guide in leaning the engine mixture to a point where detonation is just avoided.

One object of my invention is to provide means for rendering a detonation detector operative over the limited portion of the working cycle of an internal combustion engine during which detonation may occur and inoperative over the remainder of the engine cycle thereby preventing false indications of detonation.

Another object of my invention is to provide means for increasing the sensitivity of a vibration actuated detonation detector without thereby increasing interference from extraneous sources of vibration.

A further object is to provide means for detecting incipient detonation, thereby making it possible to give ample warning before detonation becomes severe enough to damage an engine.

Still another object is to improve the indication furnished by a detonation detection system so that it may serve as a reliable index of the safe lower limit of the fuel-air ratio of an internal combustion engine.

Other objects and advantages of my invention will become apparent as the description proceeds.

Referring to the drawing.

Figure 1:
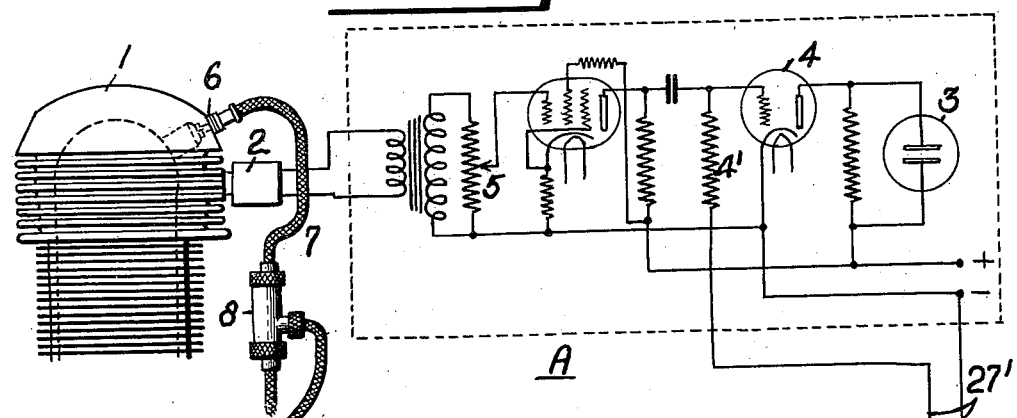
Fig. 1 is a view of my invention as applied to an internal combustion engine together with a wiring diagram of the detecting and synchronizing circuits.
Figure 2:
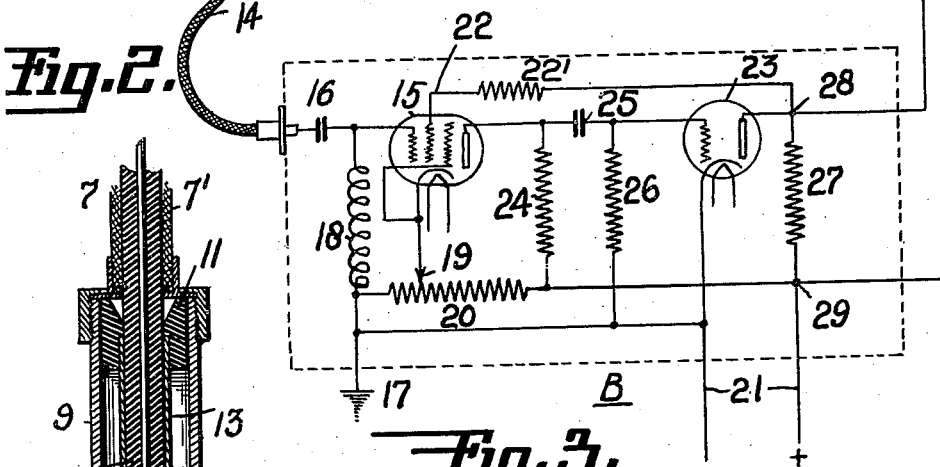
Fig. 2 is a detail, partly in section, of the electrostatic take-off from the engine ignition system.
Figure 3:
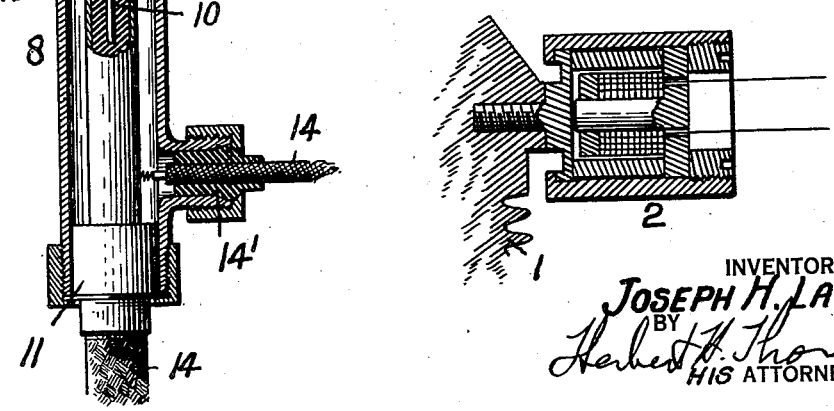
Fig. 3 is a view in section of a preferred type of an electromagnetic detonation pick-up and is similar to a type of pick-up described in the above mentioned Patent No. 2,275,675.

Referring particularly to Fig. 1, amplifier A is adapted to receive a voltage generated by detonation detector 2 and to deliver a higher voltage to neon lamp 3 causing said lamp to flash as an indication that detonation is occurring. Amplifier A is generally similar to the amplifier shown in Fig. 1 of above mentioned Patent No. 2,275,675, except that the grid of the second amplifier tube is adapted to have impressed on it the output voltage of synchronizing amplifier B in addition to the detonation signal as will be further pointed out. The operation of amplifier A without synchronizer control is fully described in the before mentioned patent. The synchronizing circuit and the manner in which it cooperates with the detector circuit will now be described.

Numeral 1 refers to the cylinder of an internal combustion engine on which is mounted detonation pick-up 2, said pick-up being designed to generate an E. M. F. proportional to rate of change of acceleration when cylinder 1 vibrates. Potentiometer 5 is a sensitivity control for adjusting the flashing point of neon lamp 3 to correspond to detonation of a predetermined minimum intensity. Likewise mounted on engine cylinder 1 is spark plug 6 connected as is usual in aircraft engines, by a single conductor cable 7, covered by flexible metallic shield 7' to the high tension distributor of the engine's ignition system, not shown. Flexible shield 7' is broken at a convenient point and synchronizer take-off 8 mounted on the cable over the insulation. This take-off comprises an outer cylindrical metallic shell 9 which is in contact with the two separated ends of shield 7' thereby completing the shielding of cable 7 and is spaced therefrom by insulating collars 11. Fitting closely over the insulating covering 12 of cable 7 is metallic sleeve 13 extending into bushings 11.

The combination of conductor 10 of cable 7 and metallic sleeve 13 forms an electrical condenser and since the outer shell of spark plug 6 and the cable shielding 7' are at engine frame or ground potential, the passage of ignition current through conductor 10 will induce a potential difference between sleeve 13 and ground. Insulated and shielded lead 14 passing through insulating gland 14' connects sleeve 13 through a spring connection to one side of condenser 16, the other side of which is connected to the control grid of pentode 15, the first tube in synchronizing amplifier B. A ground connection is shown at 17, this ground being assumed to be of the same potential as the engine frame.

Coil 18 is bridged from the control grid of tube 15 to ground and in combination with condenser 16 forms a high pass filter whose cut-off point, by suitable choice of coil and condenser values, is adjusted to eliminate or substantially reduce frequencies below the range of vibrations caused by detonation. The negative bias applied to the grid of tube 15 is adjustable by means of contact 19 of potentiometer 20, bridged across high tension supply leads 21. Tube 15 is a pentode whose screen grid 22 is connected through resistor 22' to the plate of output tube 23. Neglecting potential drop through resistor 22' the potential of screen grid 22 is determined by the potential at junction point 28 connected to said plate. Tube 15 is coupled to the succeeding stage of amplifier B by condenser 25. Grid resistor 26 is bridged from the grid to the cathode of tube 23, no steady bias being applied to said grid. Tube 23 is a power triode operating as a D. C. amplifier and generates a continuous voltage across resistor 27. This continuous voltage, through leads 27' is applied in series with the voltage developed across grid resistor 4' to the grid of tube 4, the total effective potential being the sum of the two said potentials. It is apparent therefore that tube 4 is controlled jointly by detonation detector amplifier A and synchronizing amplifier B.

The operation of the synchronizing system is as follows: Tube 15 in synchronizing amplifier B is biased nearly to cut-off by suitably positioning movable contact 19 on potentiometer 20, so that due to the position of the operating point on its characteristic small alternating voltage applied to the grid, will produce a large change of plate current. Tube 23 has no bias applied to its grid and consequently its plate circuit is conducting and current flows through resistor 27 causing a drop of potential across said resistor in a direction such that the end of the resistor connected to junction point 28 is negative with respect to the end connected to junction point 29 of the circuit. Junction point 28 is therefore at a lower potential with respect to ground than junction point 29 which is connected to the positive side of the high tension supply, and the potential applied to screen grid 22 of tube 15 is lower than would normally be used. The combination of negative bias and low screen potential renders the plate circuit of tube 15 normally substantially non-conducting.

When ignition occurs a pulse of high frequency alternating current passes through conductor 10 of ignition cable 7 thereby, through synchronizing take-off 8, inducing an A. C. potential on the control grid of tube 15 and producing a pulse of plate current in the output of said tube. The passage of this plate current pulse through resistor 24 reduces the potential at the plate of tube 15 and on the left-hand plate of condenser 25 causing a transient current to flow through resistor 26 to the right-hand plate of said condenser. The flow of this transient current through resistor 26 renders the grid of tube 23 negative with respect to its cathode and by a suitable choice of circuit constants, this negative potential is caused to bias tube 23 below cut-off thereby rendering its plate circuit non-conductive and stopping the flow of current through resistor 27. When this stoppage of current occurs the potential of junction point 28 rises to the potential of point 29. Again neglecting the small voltage drop across resistor 22', this increased potential is applied to screen grid 22 causing a further increase in the plate current of tube 15, a greater drop through resistor 24, a lower potential at the plate and at condenser 26, and in consequence an increased negative potential on the grid of tube 23. Assume now that the pulse of ignition current which originated the above described chain of events, ceases. Tube 15 will not immediately return to its normal state because of the high positive potential on screen grid 22, which is maintained so long as the grid of tube 23 retains its negative bias and prevents the flow of plate current. The time taken by the grid of tube 23 to return to cathode potential depends on the values of the capacity of condenser 25 and the resistance of resistors 24 and 26, or, in other words, on the time constant of the grid circuit. By suitable design this time constant may be made such that the synchronizing circuit automatically holds the detonation detector amplifier operative over any desired portion of the engine cycle following ignition. After this active interval the circuits resume their normal quiescent state until another ignition pulse occurs.

The novel manner of coupling the two tubes of synchronizing amplifier B has the effect of causing the combination to generate a square voltage wave in synchronism with the ignition impulses. This square wave applied as a bias to tube 4 of detector amplifier A provides a positive and definitely timed control of the indicating means, for example, neon tube 3, joint with the control due to amplifier A. Furthermore, since the output voltage of tube 4 rises from zero, which value is maintained regardless of ordinary variations of the voltage across resistor 27 in its grid circuit, to a value determined by the decrease to zero of the voltage across said resistor 27, the amplitude of the square voltage wave is perfectly definite and independent of ordinary circuit variations.

It will be noted that the positive lead from the high tension plate supply of amplifier B is connected to the negative side of the plate supply for amplifier A. In a preferred arrangement a common source of potential is used for the two amplifiers with potential dividing means to obtain the intermediate connection common to the two amplifiers.

While I have described my invention in its application to a single cylinder of an internal combustion, it will be obvious that similar arrangements may be applied to a plurality of cylinders and the occurrence of detonation in any or all of the several cylinders independently detected. I have also found that a plurality of detonation pick-up units may be connected to a common amplifier similar to amplifier A, and that if these several pick-ups are mounted on different cylinders of an engine, a similar number of synchronizing take-offs may be mounted on the respective ignition cables of the several cylinders and connected to a common synchronizing amplifier. A great variety of arrangements is therefore possible, the common requirement being that the synchronizing circuits hold the detector circuits inoperative when valve events occur in any of the cylinders on which pick-ups are mounted. The optimum number of pick-ups and synchronizers to be employed will vary with different engines and will be determined by conditions of operation as well as by design limitations.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a system for detecting detonation in an internal combustion engine, an indicator, means for generating a first E. M. F. responsive to detonation to operate said indicator, means for biasing the indicator to render the same normally inoperative, and regulative means for generating a second E. M. F. responsive to ignition current to render said biasing means ineffective and restore the indicator to an operative condition for a predetermined desired time interval.

2. An intermittently operative detonation detector for an internal combustion engine comprising, a pick-up generating an E. M. F. in response to detonation, means for amplifying said E. M. F., an indicator receiving the output of said amplifying means, means for rendering said amplifying means cyclically operative and inoperative synchronously with events of the engine cycle including a circuit having in sequence, a pentode and a triode, resistance-capacity coupling therebetween, adjustable means for biasing said pentode, a feed-back from the plate of said triode to the screen grid of said pentode, means for applying the potential across at least a portion of the output circuit of said triode to render said amplifying means operative, and means for generating and applying an E. M. F. to the control grid of said pentode upon the occurrence of an event in said engine cycle whereby the application of said last E. M. F. produces a substantially constant potential in the output circuit of said triode for rendering said amplifying means operative, dependent as to duration on the time constant of said resistance-capacity coupling.

3. A system for detecting detonation in an internal combustion engine comprising a sensitive pick-up mounted on the engine, means for amplifying the output of said pick-up, an indicator operated from said amplifying means by which detonation is detected, and a regulative synchronizing device for biasing the pick-up amplifying means and thereby rendering the indicator normally inoperative, means for periodically removing the bias due to the synchronizing device during that portion of the engine cycle in which detonation may occur to thereby render the indicator operative, and means for controlling the regulation of said synchronizing device to retain the indicator in an operative condition for different desired time intervals.

4. A system for detecting detonation in the cylinder of an internal combustion engine comprising a signal producing pick-up mounted on the cylinder, means for amplifying the signal of said pick-up, an indicator operated from said amplifying means by which detonation is detected, thermionic means for biasing the pick-up amplifying means and thereby rendering the indicator normally inoperative, means for removing the biasing effect of the thermionic means responsive to an ignition impulse of the engine and thereby rendering the indicator operative, and means for controlling said thermionic means to retain the indicator in operative condition for varying desired time intervals.

5. A synchronizing system for detecting detonation in an internal combustion engine comprising a sensitive pick-up mounted on the engine, means for amplifying the output of said pick-up, an indicator operated from said amplifying means by which detonation is detected, biasing means normally rendering said indicator inoperative, a condenser, a square wave voltage generator coupled to the ignition system of the internal combustion engine through said condenser, said generator being operative upon the occurrence of an ignition impulse of the engine to render said biasing means inoperative and restore said indicator to operative condition for a desired time interval after ignition, and means for controlling the duration of the time interval throughout which the indicator is operatively conditioned.

6. A system for detecting detonation in an internal combustion engine comprising a sensitive pick-up mounted on the engine, an indicator operated from said pick-up by which detonation is detected, a synchronizing device by which said indicator is normally biased and thereby maintained in an inoperative condition, and regulative means, operative in response to an ignition impulse of the engine, for periodically removing the bias of said synchronizing device and thereby rendering said indicator operative for a desirable predetermined time interval during a cycle of operation of the engine.

7. A system for detecting detonation in an internal combustion engine comprising a sensitive pick-up mounted on the engine, an indicator operated from said pick-up by which detonation is detected, a synchronizing device by which said indicator is normally biased and thereby maintained in an inoperative condition, and regulative means for periodically removing the bias of said synchronizing device and thereby rendering said indicator operative for a desired time interval during a cycle of operation of the engine.

JOSEPH H. LANCOR, Jr.